Patented Dec. 31, 1935

2,025,729

UNITED STATES PATENT OFFICE 2,025,729

OIL PROOFING COMPOSITION

James K. Delano, Yonkers, N. Y.

No Drawing. Application February 21, 1933, Serial No. 657,841

16 Claims. (Cl. 134—18)

This invention relates to a coating composition for oil and grease proofing such materials as paper and the like and articles made therefrom, such as containers for holding oil, etc.

This coating composition may be described as essentially an aqueous solution of a particular type of a colloidal salt, or mixture of these salts, and included in this solution as a co-ingredient are certain other hydrophile colloid bodies.

The latter materials may be of a wide variety, and while they are important as a constituent, their selection is of a more or less incidental matter, and are expressly included in the formula for such reasons as adding additional film-forming solids, modifiers of the physical properties of the film coating, and reducing costs of the composition.

Among the materials that may be included in admixture with the colloidal salts, are any materials having colloidal properties and good inertness to oily bodies, and may be drawn from the general classes, as the albuminoids, carbohydrates, inorganic matter, and also those products of synthetic origin.

The above mentioned salts suitable for oil proofing should contain an organic acid of sufficiently high molecular weight, or particle size, to have dimensions within the zones of colloidal limits.

It is also very important that these compounds should be poly-hydroxy-acids, or otherwise high in oxygen content, it being due to their above described chemical constitution, whether combined with bases or in some instances as free acids that they possess the faculty of being dissolved or gelatinated by water or in other solvent mediums, as the case may be, such as volatile hydroxy solvents, namely the aliphatic alcohols, especially those having the shorter carbon chains.

Attempts to produce oil proofing compositions, especially for coating application on paper and the like have not yielded all around satisfactory results when such materials as gelatin, casein, dextrin, sodium silicate and the like have been used, either alone or their mixtures.

These materials possess in themselves desirable inertness towards those bodies commonly characterized as of an oily or greasy nature, and this latter classification includes those products of straight hydrocarbon products as derived from petroleum, or the fatty acid compounds as found in animal, fish or vegetable sources.

The main difficulty in preparing oil proofing coating from the above cited hydrophilic colloids is that the resultant film coatings tend to develop fine cracks or checks known as crazing, and thus, any oil in contact with the coating is readily permitted to penetrate through and permeate over wide areas of the paper or like material and even exude through the same.

In the above coating film, breakdown may be caused through mechanical handling of the coated article thus causing cracks, or by ageing alone, and brittleness and film shrinking may occur, with the resulting crazing, and even were attempts to overcome these defects by plasticizing the compound with glycerol, or with the common glycols, would not produce the complete desired results.

Whether or not due to immiscibility or lack of compatibility these plasticized coatings containing glycerol or the like do not readily lend themselves in forming a stable oil proofing coating but tend to exude from the film with the ensuing disruptive action on the compactness or impermeability of the coating, or either the glycerol is weakened by certain oils or it is absorbed from the body of the colloid base by the paper thus allowing the film to be in a more or less unplasticized state.

In this invention, water soluble salts or colloid organic acids, and more especially the salts of glycyrrhizic acid, or related acids such as glycyrrhetic acid are dissolved in water, and in the resulting solution at least one other colloidal body is included which may be any albuminous product such as gelatin, blood albumin, or any of the common glues, or there may be any of the non-crystallizing sugars or material that is high in sugar bearing products such as molasses.

For an example of this invention, potassium glycyrrhizate and a saccharic product such as molasses and more especially a form known as "black-strap" are dissolved in the optimum amount of water.

The proportions of the solids may vary over wide limits as desired to produce the desired results, and the above grade of molasses is chosen, besides its cheapness, because of the high content of dextrose and pentosan bodies.

The resulting coating besides possessing high oil impermeability is very tough and elastic and maintains these properties over the desired periods of time.

Besides the above mentioned potassium salt, various other salts may be used, either alone or their mixtures, such as the ammonium, sodium or calcium glycyrrhizate.

Besides these salts of glycyrrhizic acid, the related glycyrrhetic acid may be used in the form of salts, either wholly or partly substituting the first named acid.

Other salts than those mentioned may be used in addition or to replace part of the aforesaid salts, and the salts of glycyrrhizic and glycyrrhetic acids in their more or less purified form, substantially less pure forms may be used, such as the extracted substance known as glycyrrhiza which is known to contain mixtures of the potassium and calcium glycyrrhizates and glycyrrhetates.

As the other substantially present matter in the extract of glycyrrhiza is mainly of a carbohydrate nature consisting largely of saccharic matter and other substances which will gel with water, their presence is of no disadvantage.

Besides the necessary constituents of this composition, other materials may be included such as solids like clays or pigments or other coloring matter, or certain other materials may be incorporated by emulsification.

Having thus described my invention, what I claim as new and desire to secure by Letters Patents, is—

1. An oil proofing composition consisting of the aggregate of salts of glycyrrhizic acid and salts of homologous acids derived from the extract of glycyrrhiza in admixture with an albuminoid.

2. An oil proofing composition consisting of a water soluble salt of glycyrrhizic acid in admixture with an albuminoid.

3. An oil proofing composition consisting of the aggregate of salts of glycyrrhizic acid and salts of homologous acids derived from the extract of glycyrrhiza in admixture with an albuminous glue.

4. An oil proofing composition consisting of glycyrrhiza in admixture with an albuminous glue.

5. An oil proofing composition consisting of a hydrosol-forming salt of a polyhydroxy organic acid derived from the introduction of a carboxylic acid in a saccharide, in admixture with a hydrosol-forming carbohydrate.

6. An oil proofing composition consisting of a hydrosol-forming salt of a polyhydroxy organic acid derived from the introduction of carboxylic acid in a saccharide, in admixture with a hydrosol-forming albuminoid and a carbohydrate.

7. An oil proofing composition consisting of a water soluble salt of glycyrrhizic acid in admixture with a carbohydrate and dissolved in water.

8. An oil proofing composition consisting of a water soluble salt of glycyrrhizic acid in admixture with an albuminoid and a carbohydrate and dissolved in water.

9. An oil proofing composition consisting of a water soluble salt, or a mixture of these salts, of glycyrrhizic acids, in admixture with a carbohydrate.

10. An oil proofing composition consisting of a water soluble salt, or a mixture of these salts, of glycyrrhetic acids, in admixture with an albuminoid and a carbohydrate.

11. An oil proofing composition consisting of the aggregate of salts of glycyrrhizic acid and salts of homologous acids derived from the extract of glycyrrhizic in admixture with a carbohydrate.

12. An oil proofing composition consisting of the aggregate of salts of glycyrrhizic acid and salts of homologous acids derived from the extract of glycyrrhizic in admixture with an albuminoid and a carbohydrate.

13. An oil proofing composition consisting of the aggregate of salts of glycyrrhizic acid and salts of homologous acids derived from the extract of glycyrrhiza in admixture with a carbohydrate body rich in dextrose and pentosans.

14. An oil proofing composition consisting of the aggregate of salts of glycyrrhizic acid and salts of homologous acids derived from the extract of glycyrrhiza in admixture with an albuminous glue and a carbohydrate body rich in dextrose and pentosans.

15. An oil proofing composition consisting of glycyrrhiza in admixture with a carbohydrate body rich in dextrose and pentosans.

16. An oil proofing composition consisting of glycyrrhiza in admixture with an albuminous glue and a carbohydrate body rich in dextrose and pentosans.

JAMES K. DELANO.